(12) United States Patent
Wong et al.

(10) Patent No.: US 9,038,056 B1
(45) Date of Patent: May 19, 2015

(54) METHOD AND APPARATUS FOR PERFORMING AUTOMATABLE SOFTWARE UPGRADES USING A LIGHTWEIGHT SERVICELESS INSTALL AGENT

(75) Inventors: Jeffrey Wong, Oakland, CA (US); Kevin Freeman, Danville, CA (US); Catherine Howe, Irmo, SC (US); Wayne Wong, Milpitas, CA (US); Bill McCarty, San Jose, CA (US)

(73) Assignee: AVAYA INC., Basking Ridge, NJ (US)

( * ) Notice: Subject to any disclaimer, the term of this patent is extended or adjusted under 35 U.S.C. 154(b) by 692 days.

(21) Appl. No.: 12/719,516

(22) Filed: Mar. 8, 2010

Related U.S. Application Data

(60) Provisional application No. 61/165,052, filed on Mar. 31, 2009.

(51) Int. Cl.
*G06F 9/44* (2006.01)
*G06F 9/445* (2006.01)

(52) U.S. Cl.
CPC .................................. *G06F 8/65* (2013.01)

(58) Field of Classification Search
USPC .......................... 717/168–176; 709/203–204
See application file for complete search history.

(56) References Cited

U.S. PATENT DOCUMENTS

| | | | |
|---|---|---|---|
| 6,009,274 A * | 12/1999 | Fletcher et al. | 717/173 |
| 6,986,133 B2 * | 1/2006 | O'Brien et al. | 717/173 |
| 7,124,289 B1 * | 10/2006 | Suorsa | 713/1 |
| 7,178,144 B2 * | 2/2007 | Melchione et al. | 717/172 |
| 7,555,749 B2 * | 6/2009 | Wickham et al. | 717/168 |
| 7,823,147 B2 * | 10/2010 | Moshir et al. | 717/173 |
| 7,926,051 B2 * | 4/2011 | Barta et al. | 717/174 |
| 7,984,435 B2 * | 7/2011 | Kokkinen | 717/170 |
| 8,005,890 B2 * | 8/2011 | Rachitsky et al. | 709/202 |
| 8,209,680 B1 * | 6/2012 | Le et al. | 717/174 |
| 8,407,687 B2 * | 3/2013 | Moshir et al. | 717/171 |
| 8,527,979 B2 * | 9/2013 | Wookey | 717/169 |
| 8,533,704 B2 * | 9/2013 | Wookey | 717/174 |
| 8,769,522 B2 * | 7/2014 | Venkatraman et al. | 717/173 |

OTHER PUBLICATIONS

Tucker et al, "OPIUM: Optimal Package Install/Uninstall Manager", IEEE, pp. 1-10, 2007.*
Dastidar et al, "Safe Peer-to-Peer Self-Downloading", ACM Transactions on Autonomous and Adaptive Systems, vol. 3, No. 4, Article 19, pp. 1-18, 2008.*
Wang et al, "An Incremental SMLAOI Algorithm for Progressive Downloading Large Scale WebVR Scenes" ACM, pp. 55-60, 2009.*
Uribarren et al, "Middleware for Distributed Services and Mobile Applications", ACM, pp. 1-7, 2006.*

* cited by examiner

*Primary Examiner* — Anil Khatri
(74) *Attorney, Agent, or Firm* — Anderson Gorecki & Rouille LLP

(57) ABSTRACT

A method, apparatus and computer program product for performing automatic enterprise software upgrades is presented. An install agent application of a target system authorizes a centralized controller to securely communicate with the target system. The install agent downloads an upgrade for an enterprise software application installed on said target system from the centralized controller and executes the upgrade for an enterprise software application installed on the target system.

14 Claims, 3 Drawing Sheets

METHOD AND APPARATUS FOR PERFORMING AUTOMATABLE SOFTWARE UPGRADES USING A LIGHTWEIGHT SERVICELESS INSTALL AGENT

CROSS REFERENCE TO RELATED APPLICATIONS

The present application claims the benefit of U.S. Provisional Patent Application No. 61/165,052, filed on Mar. 31, 2009, which is incorporated herein by reference in its entirety.

BACKGROUND

Many industry products are moving towards a software model where they are offered as software packages that run on standard platforms including off the shelf Personal Computer (PC) systems and on standard operating systems such as Windows® (available from Microsoft Corporation of Redmond, Wash.) and Linux®. By eliminating or greatly reducing the need for costly proprietary hardware, both the cost of development and deployment of these software products can be greatly reduced. For these systems which must handle large amounts of load, rather than running this load on a small number of very fast, but also very expensive systems, many products are able to distribute load across a large number of inexpensive computer systems.

For server applications software, software updates are typically applied manually to target systems. Multisystem clusters require the administrator to physically log into each system, manually load the software via Computer Disk (CD) or network share, and then execute the software update process.

Several products exist today with the end goal of keeping software up to date. One of the more commonly used products is Windows Update® available from Microsoft Corporation of Redmond, Wash. Users can use this tool to keep their Windows-based operating system up to date with the latest patches and security fixes. Software updates through Windows Update are pulled from a centralized server provided by Microsoft. Although Microsoft is able to control which users may download new content, they are unable to push content to specific computer systems in a particular order since the upgrade request is initiated from each target system rather than a centralized manager. Other conventional products aim to solve similar problems by providing framework software that companies can use to allow software updates to be securely retrieved from a centralized server.

Another product which exists in the marketplace that is similar to the install agent is developed by IBM of Armonk, N.Y. One of the components of IBM's Express Runtime® is its IBM installation agent. This software resides both on the target systems and also a centralized manager and allows for more discrete and controllable upgrades of IBM-based middleware from a central manager.

SUMMARY

Conventional mechanisms such as those explained above suffer from a variety of deficiencies. One such drawback is that conventional software upgrade products such as Windows update will not work for enterprise products used in actual deployments since customers will need to perform validation of any software updates, typically in a non-production lab environment before deploying these updates on their production servers. Additionally, customers may need to apply updates in a discrete fashion where only certain systems are upgraded at a time to ensure that there are always sufficient systems online to handle incoming traffic. Further, enterprise customers want greater control over the upgrade process rather than having their computer systems decide when and how to perform software upgrades. Further still, customers generally do not want their production servers to be connected to the outside world (i.e. any servers which reside outside of the deployment) for security reasons.

A drawback associated with conventional framework software that allows software updates to be securely retrieved from a centralized server is that most of this is generally aimed at consumers of regular desktop software, and is generally not targeted for use on enterprise server systems, most of which will not have Internet access beyond the lab environment for security reasons. Furthermore, like Windows Update, software updates are initiated from the target system, and there is no central controller which is able to discretely manage the upgrade process across a group of systems.

A deficiency associated with the IBM Runtime product is that on Linux®, this agent runs as a separate service, consuming additional system resources even if it has no work to do. Its security mechanism is also password based, requiring the administrator to type the same password on all of the target systems and also the central manager system. This is error prone, as any lost or stolen passwords would compromise the entire system as all systems use the same password. Additionally, using passwords requires additional work for the administrator to perform to authenticate the different systems. Further, rogue systems with the password could act as a target system or a centralized manager, even if they were never intended to be within this network of systems. Further still, password based systems are inherently prone to things like lost or mistyped passwords. In addition, the IBM's software appears to require that there be a web browser installed on each of the target systems, which can violate security policies prohibiting non-essential software from being installed on enterprise servers.

The present method and apparatus for providing a lightweight serviceless install agent for automatable software upgrades includes a secure install agent which can be used to quickly perform software updates for complex systems in a secure and automated fashion. This mechanism can be easily adopted by other software products running on standard operating systems such as Linux. This component is also flexible enough to allow for application-specific hooks which execute logic specifically designed for (or required by) the target software. Since the install agent is itself a software component, it also has the ability to update itself in case additional functionality or changes are required.

One of the benefits provided by the presently disclosed install agent over conventional products like MS update is the ability for the central controller to dictate how and when the systems can be upgraded and to execute logic in between upgrades either on the central controller or on the target system(s). The controller is also capable of controlling how many systems are being upgraded simultaneously so that a certain quality of service (e.g. always have at least 30% of systems online and NOT being upgraded) can be guaranteed, which is essential for enterprise software upgrades.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

In a particular embodiment of a method for providing an install agent on a target system, the method begins by authorizing, by an install agent application of a target system, a centralized controller to securely communicate with the target system. The method additionally includes downloading, by the install agent from the centralized controller, an upgrade for an enterprise software application installed on the target system. The method further includes executing the upgrade for an enterprise software application installed on the target system.

Other embodiments include a computer readable medium having computer readable code thereon for providing an install agent on a target system. The computer readable medium includes instructions for authorizing, by an install agent application of a target system, a centralized controller to securely communicate with the target system. The computer readable medium further includes instructions for downloading, by the install agent from the centralized controller, an upgrade for an enterprise software application installed on the target system. The computer readable medium additionally includes instructions for executing the upgrade for an enterprise software application installed on the target system.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an install agent as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing an install agent as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Although the ability for products to be developed on and run on standard operating systems and computer systems can come at a significant cost savings, the amount of time and work required to deploy, upgrade, and maintain software applications across a large number of systems also increases as the number of deployed applications and computer systems increase. Moreover, as more products increasingly use more open source and third party components, the work required to install, configure, integrate, and maintain these components likewise increases. As an example, voice application products of large scope and complexity can sometimes take days or weeks to perform a simple upgrade, even if things go smoothly. Multiplied by potentially dozens of computers in a single deployment, the upgrade process quickly becomes unwieldy, time consuming, and error prone.

Figure 1:
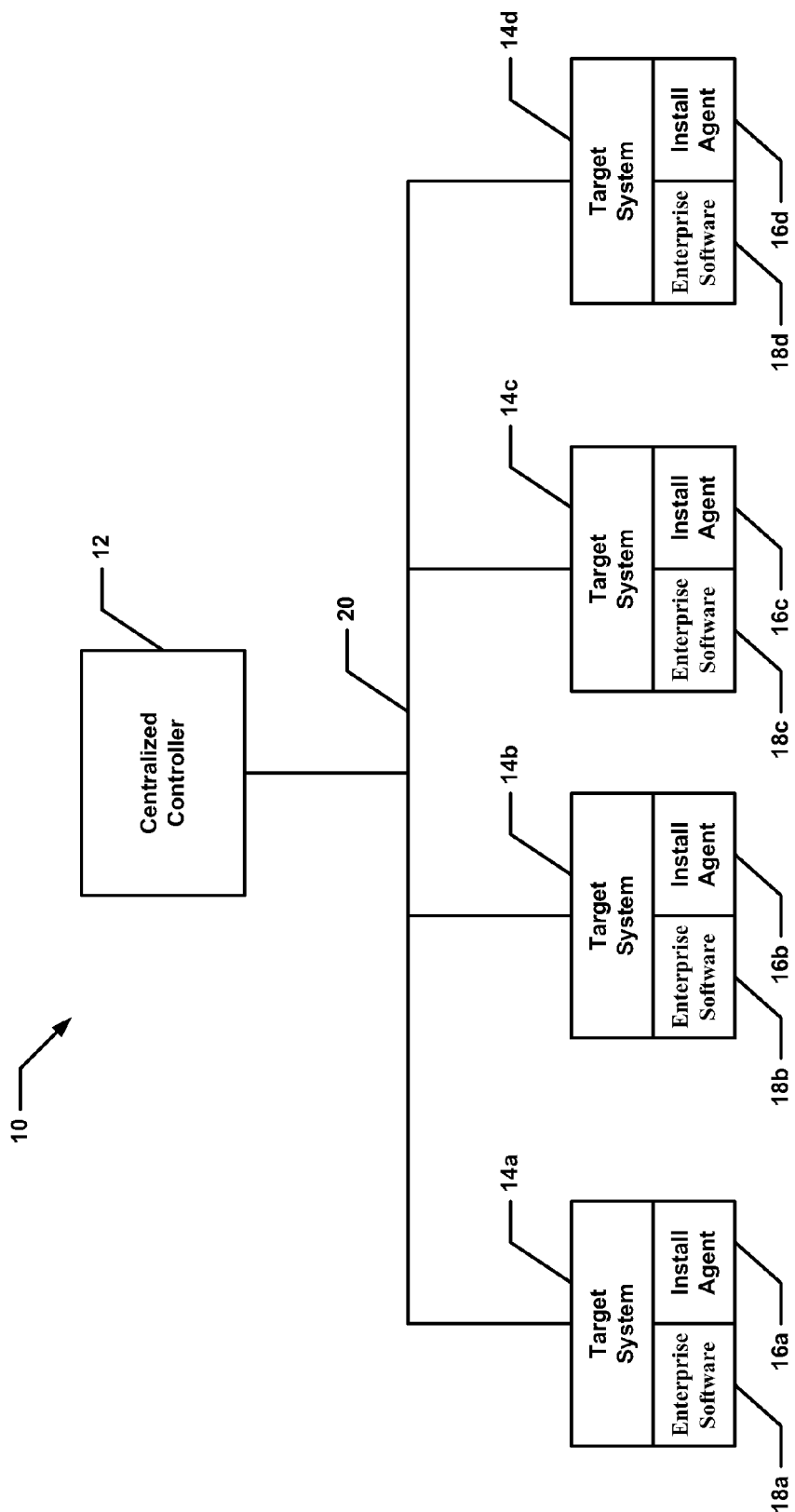
FIG. 1 comprises a block diagram of an automated upgrade environment including a lightweight serviceless install agent for automatable software upgrades in accordance with embodiments of the invention.

Referring now to FIG. 1, an automatic upgrade environment 10 is shown. Automatic upgrade environment 10 includes a centralized controller 12, in communication by way of network 20 with a plurality of target systems 14a-14d. Each target system 14a-14d includes a respective install agent 16a-16d, as well as respective enterprise software 18a-18d.

The automatic upgrade environment 10 is typically deployed in a situation where Internet access is not provided for security reasons. Further, the present automatic upgrade environment 10 is used for updating and maintaining enterprise software, as opposed to regular desktop software. Enterprise software, also known as enterprise application software (EAS), is software intended to solve an enterprise problem (rather than a departmental problem) and often written using an Enterprise Software Architecture.

Enterprise application software (e.g., voice/telephony software) is application software that performs business functions such as accounting, production scheduling, customer information management, bank account maintenance, etc. It is frequently hosted on servers and simultaneously provides services to a large number of enterprises, typically over a computer network. This is in contrast to the more common single-user software applications which run on a user's own local computer and serve only one user at a time.

Enterprise level software is software which provides business logic support functionality for an enterprise, typically in commercial organizations, which aims to improve the enterprise's productivity and efficiency. Services provided by enterprise software are typically business-oriented tools such as online shopping and online payment processing, interactive product catalogue, automated billing systems, security, content management, Business Intelligence, Human Resources (HR) Management, Manufacturing, Enterprise Forms Automation, and the like. Characteristics of enterprise software are performance, scalability, and robustness. Enterprise software typically has interfaces to other enterprise software (for example LDAP to directory services) and is centrally managed (a single admin page for example).

A secure, lightweight install agent 16a-16d resides on the target systems 14a-14d. This agent works on top of the existing SSH service, and is capable of programmatically performing and verifying downloads, and also executing software upgrades on that target system. A digital signature check can be performed as part of the execution of the software upgrade, ensuring the validity of the software package.

The centralized controller 12 manages the upgrade process and is the authorized controller for the target systems 14a-14d. Target systems 14a-14d authorize the central controller 12 via public key authentication, obviating the need to maintain any passwords for this upgrade mechanism. This allows the centralized controller 12 to connect to the target systems 14a-14d via Secure Shell (SSH), and then invoke the install agent 16a-16d to perform any supported operation, including download and execute.

The install agent 16a-16d also has the ability to run initially as a non-privileged user. However, since some of the work the install agent does may require special (root) access, the install agent has the ability to escalate itself to a special user only to execute those functions which require it.

Figure 2:
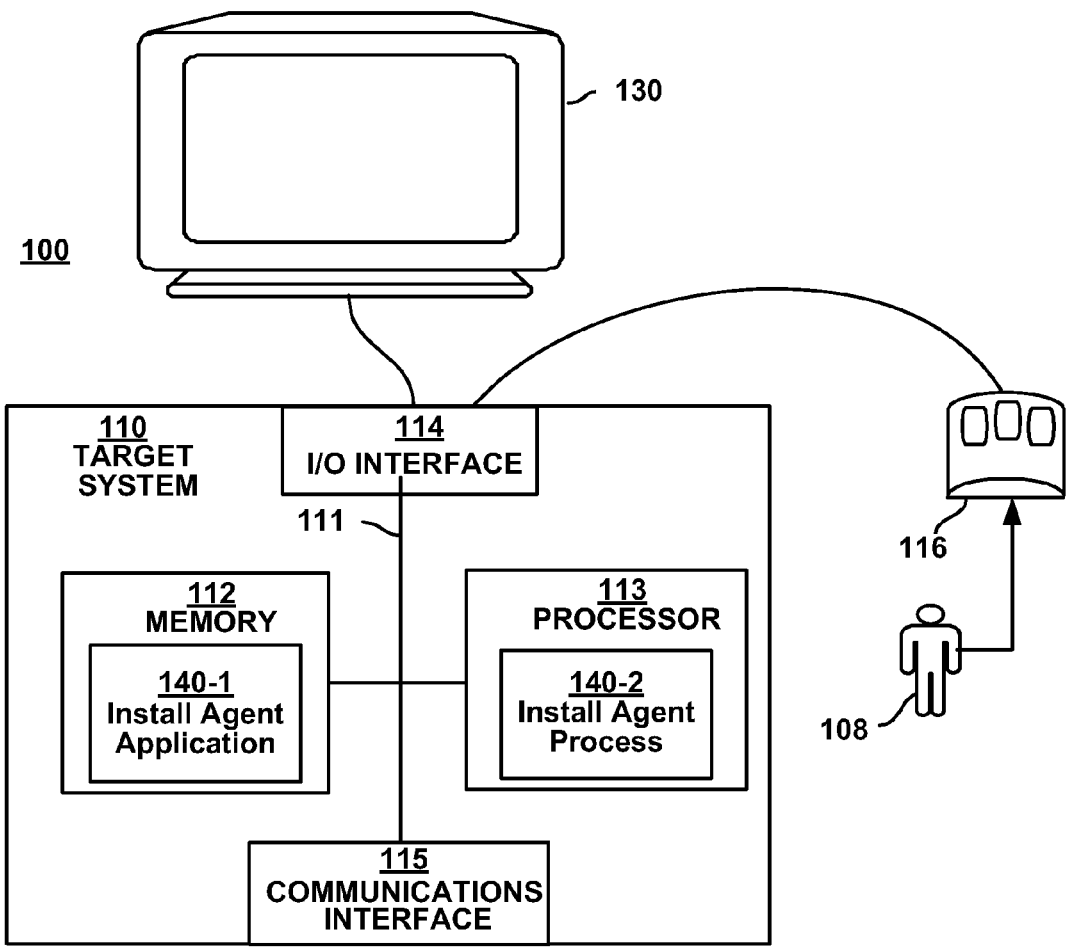
FIG. 2 comprises a block diagram of a target system having a install agent installed thereon.

FIG. 2 is a block diagram illustrating example architecture of a target system 110 that executes, runs, interprets, operates or otherwise performs an install agent operating application 140-1 and install agent operating process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the install agent operating application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with an install agent operating application 140-1 as explained herein. The install agent operating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a install agent operating application 140-1. Execution of an install agent operating application 140-1 in this manner produces processing functionality in the install agent operating process 140-2. In other words, the install agent operating process 140-2 represents one or more portions or runtime instances of a install agent operating application 140-1 (or the entire a install agent operating application 140-1) performing or executing within or upon the processor 113 in the computerized device 110 at runtime.

It is noted that example configurations disclosed herein include the install agent operating application 140-1 itself (i.e., in the form of un-executed or non-performing logic instructions and/or data). The install agent operating application 140-1 may be stored on a computer readable medium (such as a floppy disk), hard disk, electronic, magnetic, optical, or other computer readable medium. An install agent operating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of an install agent operating application 140-1 in the processor 113 as the install agent operating process 140-2. Those skilled in the art will understand that the computer system 110 may include other processes and/or software and hardware components, such as an operating system not shown in this example.

A display 130 need not be coupled directly to computer system 110. For example, the install agent operating application 140-1 can be executed on a remotely accessible computerized device via the network interface 115. In this instance, the graphical customer interface 160 may be displayed locally to a customer 108 of the remote computer, and execution of the processing herein may be client-server based.

During operation, processor 113 of computer system 100 accesses memory system 112 via the interconnect 111 in order to launch, run, execute, interpret or otherwise perform the logic instructions of the install agent application 140-1. Execution of install agent application 140-1 produces processing functionality in install agent process 140-2. In other words, the install agent process 140-2 represents one or more portions of the install agent application 140-1 (or the entire application) performing within or upon the processor 113 in the computer system 100.

It should be noted that, in addition to the install agent process 140-2, embodiments herein include the install agent application 140-1 itself (i.e., the un-executed or non-performing logic instructions and/or data). The install agent application 140-1 can be stored on a computer readable medium such as a floppy disk, hard disk, or optical medium. The install agent application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of install agent application 140-1 in processor 113 as the install agent process 140-2. Those skilled in the art will understand that the computer system 100 can include other processes and/or software and hardware components, such as an operating system that controls allocation and use of hardware resources associated with the computer system 100.

Figure 3:
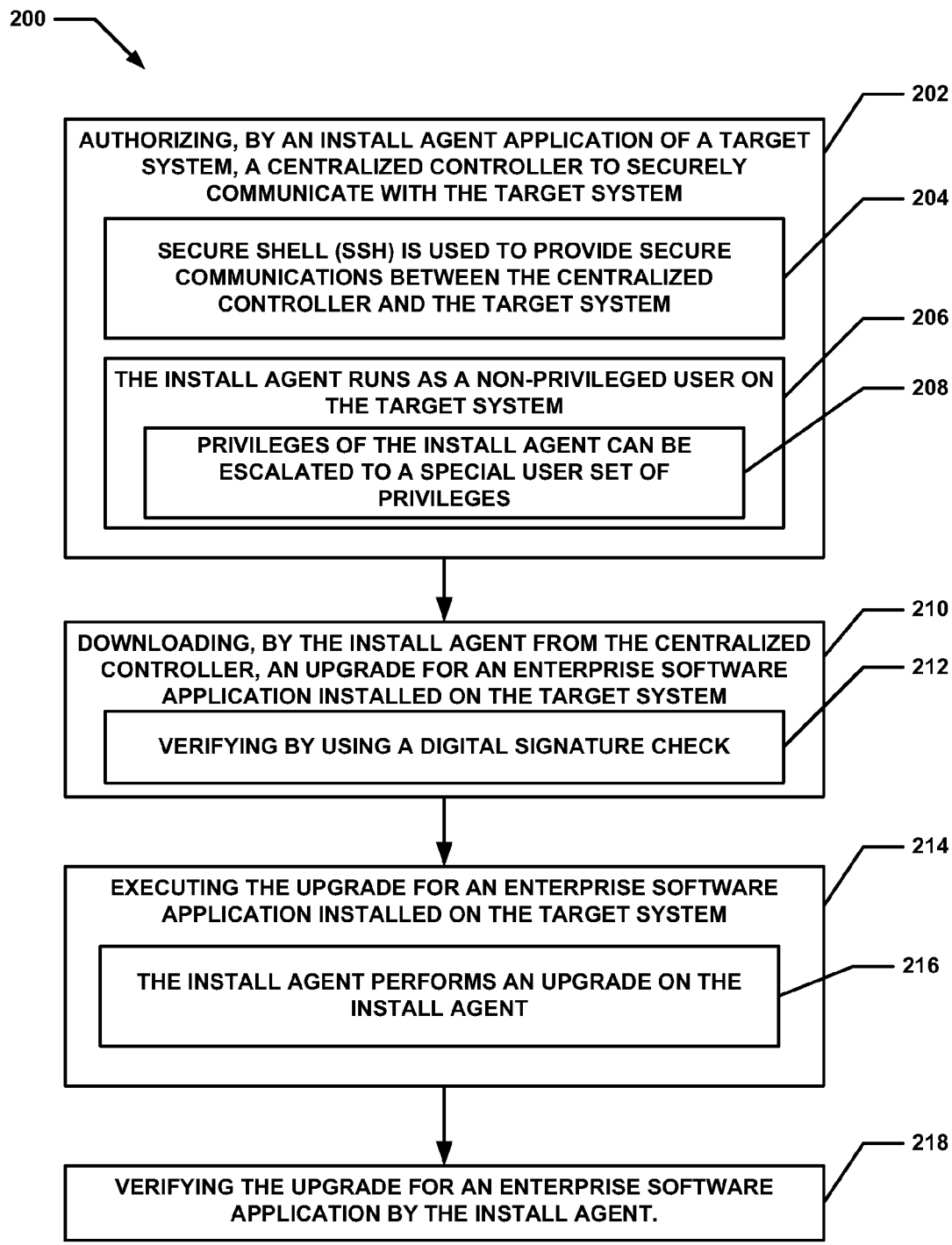
FIG. 3 comprises a flow diagram of a particular embodiment of a method of providing a lightweight serviceless install agent for automatable software upgrades in accordance with embodiments of the invention.

A flow chart of the presently disclosed method is depicted in FIG. 3. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 200 for installing and executing an install agent for providing automatic software upgrades is shown. Method 200 begins with processing block 202 which discloses authorizing, by an install agent application of a target system, a centralized controller to securely communicate with said target system. The centralized controller includes the various upgrades that need to be installed in the various target systems. The automatic upgrade environment is typically deployed in a situation where Internet access is not provided for security reasons.

Processing block 204 states wherein Secure Shell (SSH) is used to provide secure communications between said centralized controller and said target system. By utilizing the SSH service built into most Linux/Unix systems, a new service for the install agent is not required to be added. The install agent can be invoked using a standard SSH call. From the central controller's point of view, it is possible to use software libraries which implement SSH to programmatically invoke the install agent from the central controller. Since public key authentication is used, no passwords need to be exchanged for the central controller to invoke the install agent on the target system.

Processing block 206 recites the install agent runs as a non-privileged user on the target system. As shown in processing block 208, the privileges of the install agent can be escalated to a special user set of privileges. For example, some of the work the install agent does may require special (root) access; the install agent has the ability to escalate itself to a special user only to execute those functions which require it.

Processing continues with processing block 210 which discloses downloading, by the install agent from the centralized controller, an upgrade for an enterprise software application installed on the target system. Enterprise application software is application software that performs business functions such as accounting, production scheduling, customer information management, bank account maintenance, etc. It is frequently hosted on servers and simultaneously provides services to a large number of enterprises, typically over a computer network. This is in contrast to the more common single-user software applications which run on a user's own local computer and serve only one user at a time. As shown in processing block 212, the verifying the upgrade comprises verifying by using a digital signature check.

Processing block 214 states executing the upgrade for an enterprise software application installed on the target system. As further shown in processing block 216, in certain situations, install agent performs an upgrade on itself. Since the install agent is itself a software component, it also has the ability to update itself in case additional functionality or changes are required.

Processing block 218 recites verifying the upgrade for an enterprise software application by said install agent. Verification of the upgrade actually consists of two things. The first thing is verifying that software package downloaded to the target system is valid and the second thing is having the central controller verify the successful application of the software package on the target system. The former is achieved by having the install agent validate the digital signature attached to the software package, and having the centralized controller periodically query the install agent for the status until either the download and verification completes successfully, or has errored out. The verification of successful upgrade is achieved by having the install agent execute and track the execution of the software upgrade and save information on the status of the software upgrade and reporting it back to the central controller whenever requested. In a particular implementation, the central controller checks the status via the install agent every half minute or so. For both downloading and executing, the centralized controller may have (and generally should have) logic to handle error cases (e.g. retry or print an error to the screen of the central controller).

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated. Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a target system performs operations comprising:
   authorizing, by an install agent application of a target system, a centralized controller to securely communicate with said target system;
   downloading, by said install agent from said centralized controller, an upgrade for an enterprise software application installed on said target system; and
   executing said upgrade for an enterprise software application installed on said target system;
   wherein Secure Shell (SSH) is used to provide secure communications between said centralized controller and said target system; and
   verifying said upgrade for an enterprise software application by said install agent.

2. The method of claim 1 wherein said install agent runs as a non-privileged user on said target system.

3. The method of claim 2 wherein privileges of said install agent can be escalated to a special user set of privileges.

4. The method of claim 1 wherein said install agent performs an upgrade on said install agent.

5. The method of claim 1 wherein said centralized controller dictates how and when said upgrade for an enterprise software application installed on said target system will be performed.

6. A non-transitory computer readable storage medium having computer readable code thereon for an install agent, the medium including instructions in which a target system performs operations comprising:
   instructions for authorizing, by an install agent application of a target system, a centralized controller to securely communicate with said target system;
   instructions for downloading, by said install agent from said centralized controller, an upgrade for an enterprise software application installed on said target system; and
   instructions for executing said upgrade for an enterprise software application installed on said target system;
   instructions wherein Secure Shell (SSH) is used to provide secure communications between said centralized controller and said target system; and
   instructions for verifying said upgrade for an enterprise software application by said install agent.

7. The computer readable storage medium of claim 6 further comprising instructions wherein said install agent runs as a non-privileged user on said target system.

8. The computer readable storage medium of claim 7 further comprising instructions wherein privileges of said install agent can be escalated to a special user set of privileges.

9. The computer readable storage medium of claim 6 further comprising instructions wherein said install agent performs an upgrade on said install agent.

10. The computer readable storage medium of claim 6 further comprising instructions wherein said centralized controller dictates how and when said upgrade for an enterprise software application installed on said target system will be performed.

11. A target system comprising:
a memory; a processor;
a communications interface;
an interconnection mechanism coupling the memory, the processor and the communications interface; and
wherein the memory is encoded with an install agent application providing that when performed on the processor, provides a process for processing information, the process causing the target system to perform the operations of:
authorizing, by an install agent application of a target system, a centralized controller to securely communicate with said target system;
downloading, by said install agent from said centralized controller, an upgrade for an enterprise software application installed on said target system; and
executing said upgrade for an enterprise software application installed on said target system;
wherein Secure Shell (SSH) is used to provide secure communications between said centralized controller and said target system; and
verifying said upgrade for an enterprise software application by said install agent.

12. The target system of claim 11 wherein said install agent runs as a non-privileged user on said target system.

13. The target system of claim 12 wherein privileges of said install agent can be escalated to a special user set of privileges.

14. The target system of claim 11 wherein said centralized controller dictates how and when said upgrade for an enterprise software application installed on said target system will be formed.

* * * * *